(12) United States Patent
Krech, Jr. et al.

(10) Patent No.: US 6,687,855 B1
(45) Date of Patent: Feb. 3, 2004

(54) APPARATUS AND METHOD FOR STORING INFORMATION DURING A TEST PROGRAM

(75) Inventors: Alan S Krech, Jr., Fort Collins, CO (US); John M Freeseman, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 583 days.

(21) Appl. No.: 09/693,218

(22) Filed: Oct. 20, 2000

(51) Int. Cl.[7] .................................................. G06F 11/26
(52) U.S. Cl. ........................... 714/30; 714/42; 714/723; 714/742; 714/743
(58) Field of Search .............................. 714/30, 42, 45, 714/718, 720, 723, 738, 742, 743

(56) References Cited

U.S. PATENT DOCUMENTS 5,224,104 A * 6/1993 Iyaguchi ..................... 714/743
6,202,187 B1 * 3/2001 Akiyama .................... 714/739
6,591,385 B1 * 7/2003 Krech et al. ................ 714/718
6,598,112 B1 * 7/2003 Jordan et al. ................. 711/2

* cited by examiner

Primary Examiner—Scott Baderman (57) ABSTRACT

An apparatus for automatically accumulating and storing information has a destination memory and an indexing circuit. The indexing circuit has an input port, a selector having a selector output, a register holding a value from the selector output and presenting the selector output value at a register output, and an accumulator accepting a value from the input port and a value from the register output and presenting a sum of the input port and register output values at an accumulator output. The selector receives the input port value from the input port, the accumulator output, and the value from the register output, the selector output being based upon a programmable selection code. The register output is connected to the destination memory.

20 Claims, 6 Drawing Sheets

APPARATUS AND METHOD FOR STORING INFORMATION DURING A TEST PROGRAM

BACKGROUND

Electronics devices and capabilities have grown extremely common in daily life. Along with personal computers in the home, many individuals carry more than one productivity tool for various and sundry purposes. Most personal productivity electronic devices include some form of non-volatile memory. Cell phones utilize non-volatile memory in order to store and retain user programmed phone numbers and configurations when the power is turned off. PCMCIA cards utilize non-volatile memory to store and retain information even when the card is removed from its slot in the computer. Many other common electronic devices also benefit from the long-term storage capability of non-volatile memory in un-powered assemblies.

Non-volatile memory manufacturers that sell to the electronic equipment manufacturers require testers to exercise and verify the proper operation of the memories that they produce. Due to the volume of non-volatile memories that are manufactured and sold at consistently low prices, it is very important to minimize the time it takes to test a single part. Purchasers of non-volatile memories require memory manufacturers to provide high shipment yields because of the cost savings associated with the practice of incorporating the memory devices into more expensive assemblies with minimal or no testing. Accordingly, the memory testing process must be sufficiently efficient to identify a large percentage of non-conforming parts and preferably all non-conforming parts in a single test process.

As non-volatile memories become larger, denser and more complex, the testers must be able to handle the increased size and complexity without significantly increasing the time it takes to test them. As memories evolve and improve, the tester must be able to easily accommodate the changes made to the device. Another issue specific to testing non-volatile memories is that repeated writes to cells of the memories can degrade the overall lifetime performance of the part. Non-volatile memory manufacturers have responded to many of the testing issues by building special test modes into the memory devices. These test modes are not used at all by the purchaser of the memory, but may be accessed by the manufacturer to test all or significant portions of the memories in as little time as possible and as efficiently as possible. Some non-volatile memories are also capable of being repaired during the test process. The tester, therefore, should be able to identify: a need for repair; a location of the repair; the type of repair needed; and, must then be able to perform the appropriate repair. Such a repair process requires a tester that is able to detect and isolate a specific nonconforming portion of the memory. In order to take full advantage of the special test modes as well as the repair functions, it is beneficial for a tester to be able to execute a test program that supports conditional branching based upon an expected response from the device.

From a conceptual perspective, the process of testing memories is an algorithmic process. As an example, typical tests include sequentially incrementing or decrementing memory addresses while writing 0's and 1's into the memory cells. It is customary to refer to a collection of 1's and 0's being written or read during a memory cycle as a "vector", while the term "pattern" refers to a sequence of vectors. It is conventional for tests to include writing patterns into the memory space such as checkerboards, walking 1's and butterfly patterns. A test developer can more easily and efficiently generate a program to create these patterns with the aid of algorithmic constructs. A test pattern that is algorithmically coherent is also easier to debug and use logical methods to isolate portions of the pattern that do not perform as expected. A test pattern that is generated algorithmically using instructions and commands that are repeated in programming loops consume less space in tester memory. Accordingly, it is desirable to have algorithmic test pattern generation capability in a memory tester.

Precise signal edge placement and detection is also a consideration in the effectiveness of a non-volatile tester. In order to capture parts that are generally conforming at a median while not conforming within the specified margins, a non-volatile memory tester must be able to precisely place each signal edge relative in time to another signal edge. It is also important to be able to precisely measure at which point in time a signal edge is received. Accordingly, a non-volatile memory tester should have sufficient flexibility and control of the timing and placement of stimuli and responses from the Device Under Test (memory).

Memory testers are said to generate transmit vectors that are applied (stimulus) to the DUT, and receive vectors that are expected in return (response). The algorithmic logic that generates these vectors can generally do so without troubling itself about how a particular bit in a vector is to get to or from a particular signal pad in the DUT. At this level it is almost as if it were a certainty that adjacent bits in the vector would end up as physically adjacent signals on the DUT. Life should be so kind!

In reality, the correspondence between bits in a vector at the "conceptual level" and the actual signals in the DUT is apt to be rather arbitrary. If nothing were done to prevent it, it might be necessary to cross one or more probe wires as they descend from a periphery to make contact with the DUT. Such crossing is most undesirable, and it is convention to incorporate a mapping mechanism in the path of the transmit vector to rearrange the bit positions in the transmit vector before they are applied to the DUT, so that task of making physical contact is not burdened with crossings. Receive vectors are correspondingly applied to a reverse mapping mechanism before being considered. In this way the algorithmic vector generation and comparison mechanisms can be allowed to ignore this entire issue. As another example of what such mappers and reverse mappers can do, consider the case when a different instance of the same type of DUT is laid out on the same wafer, but with a rotation or some mirrored symmetry, in order to avoid wasting space on the wafer. These practices also have an effect on the correspondence between vector bit position and physical signal location, but which can be concealed by the appropriate mappings and reverse mappings. It will be appreciated that the mappings and reverse mappings needed for these situations are, once identified for a particular DUT, static, and need not change during the course of testing for that particular DUT.

As part of a testing process, it is desirable to store information relevant to performance of a device under test (DUT) during a test pattern. After completion of the test pattern, the stored data is retrieved and evaluated for purposes of repair of a device or insights into overall test objectives. Some examples of relevant information to store are a number of errors detected within a page of memory and beginning and ending addresses of cells within a memory that exhibited errors during testing. It is also desirable to write to certain registers and memories within the tester in order to modify a current state of the tester or program look up tables present in the tester. In order to minimize any impact that data storage might have on overall test time, it is also desirable to be able to perform these administrative tasks during an instruction cycle that is part of the test itself. For purposes of the present disclosure, the term "vector" is used to reference a parallel group of 1's and 0's applied to drive or receive channels connected to the DUT. The term "instruction" is used to reference a line of software within the test pattern executed by the DUT tester. "Vector" and "instruction" are used interchangeably because each instruction executed by the tester generates a vector that is applied to the DUT.

Prior art testers accomplish data storage during a test pattern by dedicating one or more counters to administer the count or recording of data that the tester stores at a later time. One or more counters might also be needed to maintain an address location into which the data is stored. To store the data, the data from the one or more data and address counters is placed on an appropriate bus and then is loaded into memory. Conventionally, the memory is located in a different processor. Disadvantageously, dedication of one or more counters to the data tracking function decreases test developer flexibility by displacing its use for another possible task. Additionally, the process of storing the counter data to memory requires more than one vector thereby lengthening test time with administrative functions.

There is a need, therefore, for a syntax and hardware assist to administer accumulation of data relevant to the testing function without increasing test time and without displacing memory tester tools.

SUMMARY

An apparatus for automatically accumulating and storing information comprises a destination memory and an indexing circuit. The indexing circuit comprises an input port, a selector having a selector output, a register holding a value from said selector output and presenting the selector output value at a register output, and an accumulator accepting a value from the input port and a value from the register output and presenting a sum of the input port and register output values at an accumulator output. The selector receives the input port value from the input port, the accumulator output, and the value from the register output, the selector output being based upon a programmable selection code. The register output is connected to the destination memory.

A method for storing information comprises the steps of fetching a program instruction word, the program instruction word comprising a first segment and a second segment and executing the first segment and the second segment. The step of executing the second segment comprises the steps of presenting a value to an indexing circuit, presenting a selection code to the indexing circuit, and accessing a destination memory with an output of the indexing circuit.

DETAILED DESCRIPTION

Figure 1:
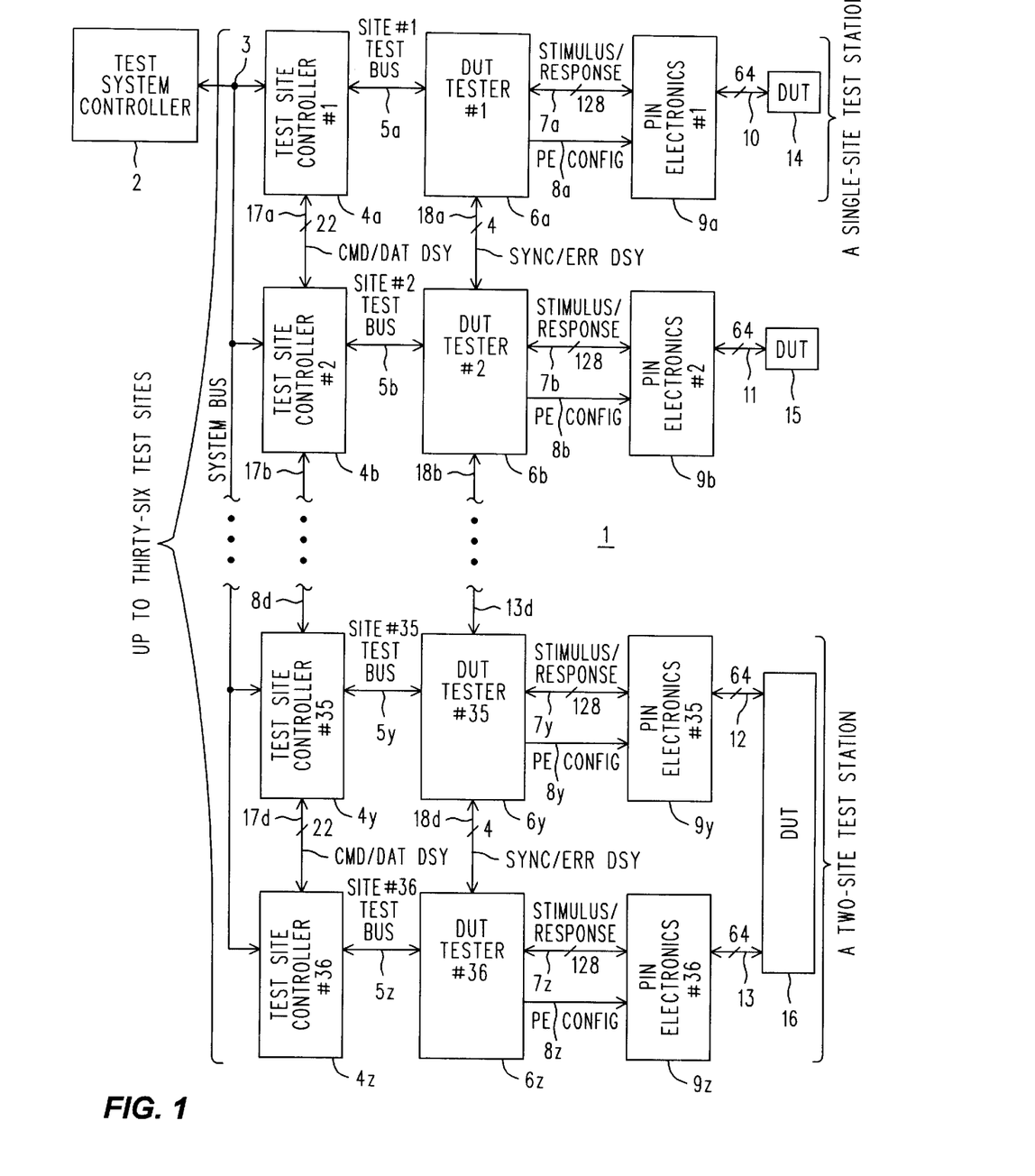
FIG. 1 is a simplified block diagram of an extensively reconfigurable non-volatile memory tester constructed in accordance with the invention.

Refer now to FIG. 1, wherein is shown a simplified block diagram 1 of a Non-Volatile Memory Test System constructed in accordance with the principles of the invention. In particular, the system shown can simultaneously test, with as many as sixty-four test points each, up to thirty-six individual DUT's (Devices Under Test) at one time, with provisions for reconfiguration to allow elements of a collection of test resources to be bonded together to test DUT's having more than sixty-four test points. These test points may be locations on a portion of an integrated circuit wafer that has not yet been diced and packaged, or they might be the pins of a packaged part. The term "test point" refers to an electrical location where a signal may be applied (e.g., power supplies, clocks, data inputs) or where a signal can be measured (e.g., a data output). We shall follow the industry custom of referring to the test points as "channels". The "collection of test resources to be bonded together" referred to above may be understood as being as many as thirty-six test sites, where each test site includes a Test Site Controller (4), a (sixty-four channel) DUT Tester (6) and a (sixty-four channel) collection of Pin Electronics (9) that makes actual electrical connection to a DUT (14). In the case where testing the DUT requires sixty-four or fewer channels, a single Test Site is sufficient to perform tests upon that DUT, and we say, for example, that the Test Site #1 (as it appears in FIG. 1) forms or operates as a "Single Site Test Station". On the other hand, when some form of the aforementioned reconfiguration is in effect, two (or more) Test Sites are "bonded" together to function as one larger equivalent Test Site having one hundred and twenty-eight channels. Accordingly, and again in reference to an example shown in FIG. 1, we say that Test Sites #35 and #36 form a "two-Site Test Station".

To briefly consider the opposite case, one should not assume that an entire Test Site is needed to test a single DUT, or that a single Test Site can test but a single DUT. Suppose that a wafer had two (probably, but not necessarily, adjacent) dies, the sum of whose test channel requirements were sixty-four channels or less. Both DUT's can be tested by a single Test Site. What makes this possible is the general purpose programmability of each Test Site. A test program executed by the Test Site may be written such that one part of the Test Site's resources is used to test one of the DUT's while another part is used to test the other DUT. After all, we would assume that if we had a third DUT that were the logical union of the first two, then we would be able to test that third DUT with a single Test Site, so we ought to be able to similarly test its "component DUT's", as it were. The only difference is individually keeping track of whether the two "component DUT's" pass or fail, as opposed to a unified answer for the "third" DUT (that is, there is an issue concerning what portion of the "third" DUT failed). This "Single-Site Multi-Test Station" capability is largely conventional, and we mention it here for the sake of completeness, and to ward off potential confusion and misunderstanding when comparing it to the notion of bonding two or more Test Sites together.

Were it not for this notion of reconfiguration there would be no difference between a Test Site and a Test Station, and we would dispense with one of the terms. As it is, however, it will be readily appreciated that the number of Test Stations need not equal the number of Test Sites. In the past, the numbers could be different because Test Sites were split to create more Test Stations (DUT's not complex enough to consume an entire Test Site). Now, however, the difference may also be due to Test Sites having been bonded together to form multi-site Test Stations (DUT's too complex for a single Test Site).

To continue, then, a Test System Controller 2 is connected by a System Bus 3 to as many as thirty-six Test Site Controllers whose names end in the suffixes #1 through #36 (4a–4z). (It is true that subscripts a–z only go from one to twenty-six, and not to thirty-six. But this minor deception seems preferable over numerical subscripts on numerical reference characters, which would be potentially very confusing.) The Test System Controller 2 is a computer (e.g., a PC running NT) executing a suitable Test System Control Program pertaining to the task of testing non-volatile memories. The Test System Control Program represents the highest level of abstraction in a hierarchical division of labor (and of complexity) for accomplishing the desired testing. The Test System Controller determines which programs are being run by the different Test Sites, as well as overseeing a robotics system (not shown) that moves the test probes and DUT's as needed. Test System Controller 2 may function in ways that support the notion that some Test Sites are programmed to perform as single-site Test Stations, while others are bonded together to form multi-site Test Stations. Clearly, in such circumstances there are different parts being tested, and it is most desirable that different tests be used for the different parts. Likewise, there is no requirement that all single-site Test Stations be testing the same style of part, nor is there any such requirement for multi-site Test Stations. Accordingly, the Test System Controller 2 is programmed to issue the commands to accomplish the needed Test Site bonding and then to invoke the appropriate test programs for the various Test Stations in use. The Test System Controller 2 also receives information about results obtained from the tests, so that it may take the appropriate action for discarding the bad part and so that it may maintain logs for the various analyses that may be used to control, say, production processes in a factory setting.

The Test System itself is a fairly large and complex system, and it is common for it to use a robotics subsystem to load wafers onto a stage that then sequentially positions one or more future dies under probes connected to the Pin Electronics 9, whereupon those future dies (the wafer has not yet been diced) are tested. The Test System can also be used to test packaged parts that have been loaded onto a suitable carrier. There will be (as is explained below), at least one Test Site Controller associated with each Test Station in use, regardless of how many Test Sites are used to form that Test Station, or of how many Test Stations are on a Test Site. A Test Site Controller is an embedded system that may be an i960 processor from Intel with thirty-six to sixty-four MB of combined program and data memory running a proprietary operating system called VOS (VersaTest O/S), which was also used in earlier products for testing non-volatile memories (e.g., the Agilent V1300 or V3300). For the moment, we shall consider only the situation for single-site Test Stations. For the sake of a definite example, suppose that Test Site #1 is functioning as Test Station #1, and that it is to test the WHIZCO part no. 0013. The test regimen involves a hundred or so different types of tests (varying and monitoring voltage levels, pulse widths, edge positions, delays, as well as a large dose of simply storing and then retrieving selected patterns of information), and each type of test involves many millions of individual memory cycles for the DUT. At the highest level, the operators of the Test System instruct the Test System Controller 2 to use Test Station #1 to begin testing WHIZCO 0013's. In due course the Test System Controller 2 tells Test Site Controller #1 (4a) (which is an embedded [computer] system) to run the associated test program, say, TEST_WHIZ_13. If that program is already available within Test Site Controller #1's environment, then it is simply executed. If not, then it is supplied by the Test System Controller 2.

Now, in principle, the program TEST_WHIZ_13 could be entirely self-contained. But if it were, then it would almost certainly be rather large, and it may be difficult for the processor of the embedded system within the Test Site Controller 4a to run fast enough to produce the tests at the desired speed, or even at a rate that is uniform from one DUT memory cycle to the next. Accordingly, low level subroutine type activities that generate sequences of address and associated data that is to be written or is expected from a read operation, are generated as needed by a programmable algorithmic mechanism located in the DUT Tester 6, but that operates in synchrony with the program being executed by the embedded system in the Test Site Controller 4. Think of this as exporting certain low level subroutine-like activity and the task of initiating DUT memory cycles out to a mechanism (the DUT Tester) that is closer to the hardware environment of the DUT 14. Generally speaking, then, whenever the Test System Controller 2 equips a Test Site Controller with a test program it also supplies the associated DUT Tester with appropriate low level implementation routines (perhaps specific to the memory being tested) needed to accomplish the overall activity described or needed by the programming for the Test Site Controller. The low level implementation routines are termed "patterns", and they are generally named (just as functions and variables in high level programming languages have names).

Each Test Site Controller #n (4) is coupled to its associated DUT Tester #n (6) by a Site Test Bus #n (5). The Test Site Controller uses the Site Test Bus 5 to both control the operation of the DUT Tester and receive therefrom information about test outcomes. The DUT Tester is capable of generating at high speed the various DUT memory cycles that are involved in the test regimen, and it decides if the results of a Read memory cycle are as expected. In essence, it responds to commands or operation codes ("named patterns") sent from the Test Site Controller by initiating corresponding useful sequences of Read and Write DUT memory cycles (i.e., it executes the corresponding patterns). Conceptually, the output of the DUT Tester 6 is stimulus information that is to be applied to the DUT, and it also accepts response information therefrom. This stimulus/response information 7a passes between the DUT Tester 6a and a Pin Electronics #1 assembly 9a. The Pin Electronics assembly 9a supports up to sixty-four probes that can be applied to the DUT 14.

The above-mentioned stimulus information is just a sequence of parallel bit patterns (i.e., a sequence of "transmit vectors" and expected "receive vectors") expressed according to the voltage levels of some family of logic devices used in the DUT Tester. There is a configurable mapping between bit positions within a stimulus/response and the probes on the die, and this mapping is understood by the DUT Tester 6. The individual bits are correct as to their timing and edge placement, but in addition to the mapping they may also need voltage level shifting before they can be applied to the DUT. Likewise, a response that originates in the DUT subsequent to a stimulus may need buffering and (reverse) level shifting before it can be considered suitable for being fed back to the DUT Tester. These level shifting tasks are the province of the Pin Electronics 9a. The Pin Electronics configuration needed for testing a WHIZCO 0013 likely will not work for testing a part from the ACME Co., and perhaps not even with another WHIZ Co. part. So, it will be appreciated that the Pin lectronics assembly needs to be configurable also; such configurability is the function of the PE Config lines 8a.

The above concludes a brief architectural overview of how a single Test Site is structured for testing a DUT. We turn now to issues that arise when there are many Test Sites with which to operate. As a preliminary, we shall describe a preferred embodiment for constructing a Test System having multiple Test Sites. In many respects, some of the information we are about to describe is a matter of choice based on market studies of customer preference and cost benefit analyses. Be that as it may, to build one of these things one has to make definite choices, and once that is done there are particular consequences that are visible throughout the entire system. It is felt that it is useful to describe, at least in a general way, the larger outlines of the hardware properties of the Test System. Even though some of these properties are contingent, knowledge of them will nevertheless assist in an appreciation of various examples used to illustrate the invention.

To begin, then, consider four rather large card cages. Each card cage has, besides power supplies and water cooling (fans can be a source of contamination in a clean room environment), a mother board, a front plane and a back plane. Into each card cage can be placed up to nine assemblies. Each assembly includes a Test Site Controller, DUT Tester and Pin Electronics. We shall be describing the general outlines of how Test Site Controllers are bonded together, which will involve some busses used to create daisy chains.

A brief digression concerning the term "daisy chain" is perhaps in order. Consider system elements A, B, C and D. Suppose that they are to be daisy chained together in that order. We could say that there is an information or control path that leaves A and goes into B, that B can selectively pass on traffic that then leaves B and goes into C, and that C can selectively pass on traffic that then goes into D. These same kind of arrangements can exist for traffic in the other direction, too. Daisy chains are often used to create priority schemes; we shall use them to create master/slave relationships between various the Test Site Controllers. We shall denote these daisy chained style communication arrangements with the suffix noun "DSY", instead of "BUS". Thus, we might refer to a Command/Data DSY instead of a Command/Data Bus. Now, the notion that information "enters B and is selectively passed on" may suggest that traffic is replicated onto a separate set of conductors before being passed on. It could be that way, but for performance reasons it is more like a regular bus having addressable entities. By means of a programmable address mapping arrangement and the ability to put portions of downstream Test Site Controllers "to sleep," the single bus can be made to logically appear (i.e., to function) as a plurality of daisy chains. Finally, it will be appreciated that the daisy chains are high performance pathways for command and control information, and that if they were not, then we could not expect a master/slave combination (multi-site Test Station) to operate as fast as a single Test Site does. For the benefit of daisy chain performance, the various DSY do not leave their respective card cages. The effect of this decision is to place some limits on which Test Sites (and thus also how many) can be bonded together. In principle, there is no fundamental need for this limitation, nor is there a genuine lack of technical practicality involved (it could be done); it is simply felt that, since there are already nine Test Sites in a card cage, extending the DSY's adds significant cost for relatively little additional benefit.

To resume our discussion of FIG. 1, then, consider the various Test Site Controllers 4a–4z that can populate the four card cages, each with nine Test Site Controllers. Let's denote them as 4a–4f, 4g–4m, 4n–4t and 4u–4z. (Never minding, as explained earlier, that these are nominally only twenty-six subscripts—the reader is invited to imagine that there are another ten subscript symbols in there, someplace.) A CMD/DAT DSY 17a (Command & Data Daisy Chain) interconnects the Test Site Controller 4a–4f that are in one card cage, while a different CMD/DAT DSY 17b interconnects the Test Site Controllers 4g–4m in another card cage. The same arrangement exists for the remaining card cages, and Test Site Controllers 4n–4t and 4u–4z, respectively. We have earlier said that the DSY do not leave the card cages, in that "tail end" of a bus that actually forms the DSY does not leave a card cage and become the head of the next segment in another card cage. Instead, the System Bus 3 from the Test System Controller 2 goes to all Test Site Controllers, and each is capable of becoming a Master at the head of a DSY segment that does not leave the card cage.

The CMD/DAT DSY 17a–d that we have been discussing exist between the various Test Site Controllers 4a–4z. There is a similar arrangement for the SYNC/ERR DSY 18a–18d and the DUT Testers 6a–6z. The synchronization and error information conveyed by the SYNC/ERR DSY 18 allows DUT Testers to function in unison. These two daisy chains (17 and 18) carry slightly different types of information, but each exists as part of the same general mechanism for bonding one or more Test Sites together into a Test Station.

Figure 2:
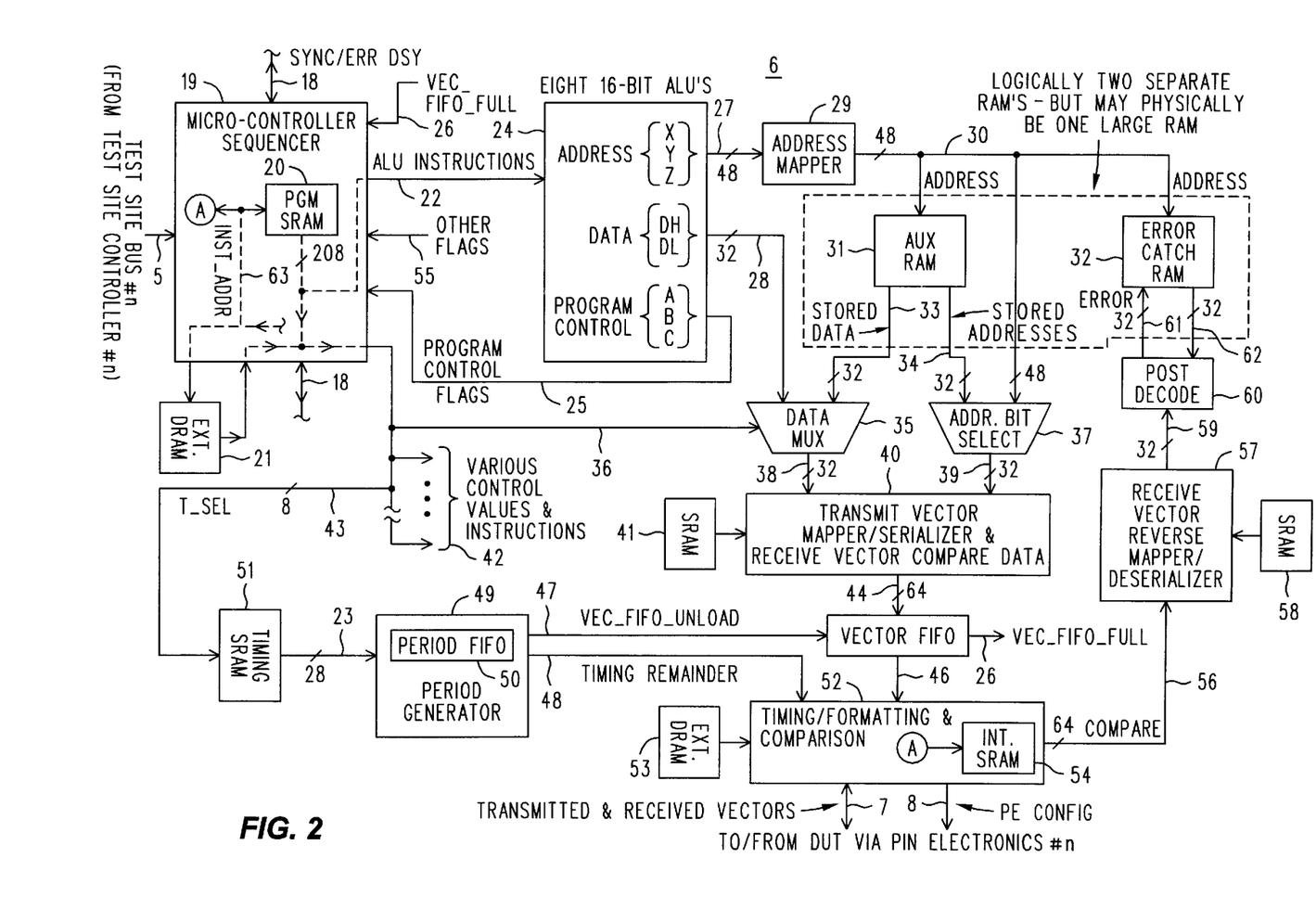
FIG. 2 is a simplified block diagram expansion of the DUT tester 6 of FIG. 1.

We turn now to a discussion of FIG. 2, which is a simplified block diagram expansion of the DUT tester 6 of FIG. 1, of which there may be as many as thirty-six. It is sufficient at present to describe only one instance thereof. A glance at FIG. 2 will show that it is a fairly well populated with stuff, especially so for a "simplified" block diagram. Some of what is in the DUT Tester 6 and represented in the block diagram is functionally quite complicated, and is not available in "off the shelf" form. It is appropriate here to make two points. First, the primary purpose of including FIG. 2 is to describe the basic properties of an important operational environment within the overall Non-Volatile Memory Test System 1. The invention(s) that are fully described in connection with FIG. 3 and subsequent figures will either be expansions of mechanisms set out in the following description of FIG. 2, or they will be new mechanisms whose motivational premise is found in FIG. 2. Either way, as this is written it is not known exactly which of these is before the reader. The goal at present is to provide a simplified yet informative starting point for numerous different Detailed Descriptions of various Preferred Embodiments, so that each of those can be as concise as is appropriate (as opposed to one "jumbo" Specification that discloses everything about each different invention). The second point is that the expanded or extended material, while in general overall agreement with FIG. 2, may contain information that does not "match-up" exactly with the simplified version. This does not mean there has been an error, or that things are fatally inconsistent; it arises because it is sometimes difficult or impossible to simplify something such that it is the exact image in miniature. The situation is rather like maps. A standard size road map of Colorado will show that when going east on I-70 you can go north on I-25 at Denver. It looks like a left turn. And while it did used to be an actual left turn, it isn't one now, and a detailed map of that intersection will show a sequence of component turns and intervening road sections. But no one would say that the standard size road map is wrong; it is correct for its level of abstraction. Similarly, and despite its fairly busy appearance, FIG. 2 is indeed a simplification operating at a medium level of abstraction, but some seeming left turns are not simple left turns at all.

As is shown in FIG. 1, the major input to the DUT Tester 6 is an instance of the Test Site Bus 5, which originates from a Test Site Controller 4 that is associated with the instance of the DUT Tester 6 that is of interest. The Test Site Bus 5 is coupled to a Micro-Controller Sequencer 19, which may be likened to a special purpose microprocessor. It fetches instructions from a program stored in a program memory, which may be either internal to the Micro-Controller Sequencer 6 (PGM SRAM 20) or external thereto (EXT. DRAM 21). Although these two memories appear to be addressed by what is essentially a logically common address 63 that serves as a program counter (or, instruction fetch address), and either can be a source of programming to be executed, note that: (1) Only one of the memories performs instruction fetch memory cycles during any period of time; and (2) In fact they are addressed by electrically different signals. The SRAM is fast and allows genuine random access, but consumes valuable space within the Micro-Sequence Controller 19 (which is a large IC), so its size is limited. The external DRAM can be provided in adjustable amounts of considerable quantity, but is fast only when accessed in sequential chunks involving linear execution and no branching. Programming in the SRAM 20 most often that which is intensely algorithmic, while the EXT. DRAM 21 is best suited for material not readily generated by algorithmic processes, such as initialization routines and random or irregular data.

The instruction word executed by the Micro-Controller Sequencer 19 is fairly wide: two hundred and eight bits. It consists of thirteen sixteen-bit fields. These fields often represent fetched instruction information for mechanisms that are outside the Micro-Controller Sequencer proper. Such fields are dedicated to their associated mechanisms. One set of ALU INSTRUCTIONS 22 are applied to a collection of eight sixteen-bit ALU's 24, while others are disbursed to various other mechanisms distributed throughout the DUT Tester. This latter situation is represented by the lines and legend "VARIOUS CONTROL VALUES & INSTRUCTIONS" 42.

The eight sixteen-bit ALU's (24) each have a conventional repertoire of arithmetic instructions built around associated sixteen-bit result registers (each ALU has several other registers, too). Three of these result registers and their associated ALU's are for generating X, Y and Z address components 27 that are variously combined into a complete address to supplied to the DUT. Two more of the eight ALU/registers (DH & DL) are provided to assist in the algorithmic creation of thirty-two bit data patterns 28 that are divided between a most significant portion (DH) and a least significant portion (DL). A final three ALU/registers (A, B, C) are used as counters and contribute to the production of various PROGRAM CONTROL FLAGS 25 that assist with program control and branching on completion of some programmatically specified number of iterations or other numerical condition. These PROGRAM CONTROL FLAGS 25 are sent back to the Micro-Controller Sequencer 19, where they affect the value of the instruction fetch address in ways familiar to those who understand about microprocessors. There are also various OTHER FLAGS 55 that also can be used to effect program branching. These originate with various ones of the other mechanisms within the DUT Tester 6 that are controlled by the different fields of the fetched instruction word. One specific additional flag is expressly shown as a separate item: VEC_FIFO_FULL 26. In another drawing having somewhat less detail it might be lumped in along with the OTHER FLAGS 55. We have separated it out to assist in explaining one aspect of the operation of the Micro-Controller Sequencer 19.

What VEC_FIFO_FULL does is to (temporarily) halt further program execution by the Micro-Controller Sequencer 19. There are many stages of pipeline between the instructions fetched by the Micro-Controller Sequencer 19 and the mechanism that finally hands test vectors off to be applied to the DUT. In addition, part of the baggage that accompanies a vector as it moves toward being applied to the DUT is information concerning the rate of eventual vector application, or, each vector's duration. Thus, the rate of vector application to the DUT need not be constant, and in particular, a group of vectors may take longer to apply than they did to generate. The Micro-Controller Sequencer simply executes programming at its maximum rate. But clearly, on average, the rate of "vector consumption," as it were, must equal the rate of "vector production," lest the pipeline need to be elastic nearly without limit. There is a Vector FIFO 45 at the output of the Address Mapper 29 discussed below, and it serves as an elastic capacity in the pipeline. The signal VEC_FIFO_FULL is used to prevent overrunning the limited number of stages in the pipeline, by causing a temporary cessation in the production of new vectors at the head end of the pipe.

To continue, the (three times sixteen equals forty-eight bits of) X, Y and Z address components 27 are applied to an Address Mapper 29, whose output is a selected-in-advance nearly arbitrary rearrangement of the address values in the ordered forty-eight bit address space. As a point of departure for appreciating this, suppose for a moment that the Address Mapper 29 were a memory that fully populated a forty-eight bit address space, and that it held a forty-eight bit value at each address. (Temporarily never mind that such a memory would—today anyway—be size of a large refrigerator.) Given such a memory, a look-up table could be implemented that could map any applied address into another, arbitrarily selected, forty-eight bit value which could then be used as a replacement address. The reason that such address mapping is desirable is that the X, Y and Z address components generally have useful meaning in the context of a particular DUT's internal architecture, which is most likely not implemented with one big linear decoder. The notions of rows, columns and layers, block or pages may be very useful to the Test Engineer, and failures that occur in locations that are physically close together may involve corresponding closeness in their X, Y and Z addresses. Such patterns in the test results can be valuable in appreciating what is wrong and in trying to fix it, whether at a design level or at a production level of reprogramming a part to shunt a defective section's operation with that of a spare section. Two issues arise from such thinking. The first is paring the forty-eight bits down to the actual number of bits (say, thirty-two, or perhaps sixteen) to be applied to the DUT. We shall shortly briefly mention how the paring down is done, and it is largely a matter of taking this many bits from X, that many from Y and the rest from Z. But not entirely, and this is the second issue, because certain addresses might lie within circuitry that is a left-for-right (or left-for-right and top-for bottom) mirror image of another section of circuitry. This has the effect of rearranging what the bits mean, as far as what sequential address values are in physical order within that circuitry. This chip layout property may occur many times, and it may well be the case that how one group of bits for, say, Y, are interpreted, may depend upon the accompanying value of some other, say, Z bits. The address mapper 29 is provided to allow the raw X, Y and Z addresses to be "repackaged," as it were, to reflect this sort of thing for the benefit of those who would test memories having such internal architectural arrangements. As to how its actually done, the Address Mapper 29 is constructed of a fairly large number of interconnected multiplexers. It cannot implement the completely arbitrary look-up table behavior of a fully populated memory decode scheme as was temporarily assumed above for purposes of explanation. It can however, rearrange sub-fields of the X, Y and Z address components as needed, particularly since there is yet another mechanism that will do the paring down from forty-eight bits to the actual number needed. The Address Mapper 29 also contains three sixteen bit (address) look-up tables that allow it to perform limited arbitrary mapping within local ranges.

The mapped address output 30 of the Address Mapper 29 is applied as an address to an Aux RAM 31 and to an Error Catch RAM 32, which, while having separate functions, may nevertheless be implemented selectable partitions in one larger overall RAM. The mapped address output 30 is also applied as one input to an Addr. Bit Select circuit 37, which is described below.

Consider the Aux RAM 31. Its function is to retain data patterns 33 and addresses 34 that can be applied to the DUT. These are logically separate outputs from the Aux RAM 31, since they are treated somewhat differently and used in different places. (The AUX RAM 31 is not a dual "port memory", but is preferably of several banks whose outputs are applied to MUX's.) In keeping with this, it may be that Stored Data 33 is kept in one bank or range of addresses of the Aux RAM 31, while Stored Addresses 34 are kept in another. Also, we have not shown an explicit mechanism for writing to the Aux RAM 31. That is accomplished by an addressed bus operation initiated by a Test Site Controller 4 at the behest of the program it is executing. (There is an "under the floorboards," as it were, "utility services" bus called the "Ring Bus" [not shown—as it would clutter the drawing immensely] that goes to just about everything in FIG. 2.)

The Error Catch RAM 32 is addressed by the same address that is applied to the Aux RAM 31, and it either stores or retrieves information about errors, which operations are performed in conjunction with a Post Decode Circuit, to be discussed later. As with the paths 33 and 34 from the Aux RAM 31, paths 61 (into the Error Catch RAM) and 62 (from the Error Catch RAM) are preferably MUX'ed outputs from a multi-bank memory (the Error Catch RAM 32), in accordance with configuration information distributed by the Ring Bus (not shown).

Note that the Data MUX 35 has as inputs the STORED DATA output 33 from the Aux RAM 31 as well as data 28 from the registers DH and DL in the collection 24 of ALU's. The Data MUX 35 selects which of these inputs (28, 32) to present as its output 38, which is then applied as one of two vector components to a Transmit Vector Mapper/Serializer/Receive Vector Compare Data Circuit 40 (the other component is the output 39 of the Addr. Bit Select circuit 37). Circuit 40 car arbitrary dynamic correspondence (mapping) between the ordered bits of the logical representation of the transmit vector and the actual physical channel number of the Pin Electronics (i.e., which probe tip) will contact the DUT on behalf of that signal (i.e., that bit in the vector); and,
cooperate with the compiler in the division of an entire logical vector into pieces to be applied separately and in order (serialization) for DUT's that admit of such a thing. Which of these functions is performed is determined by control signals from an SRAM 41, which is also addressed in accordance with a field in the two hundred and eight bit instruction fetched by the Micro-Controller Sequencer 19. The output of Circuit 40 is an up to sixty-four bit vector 44 that is applied to a Vector FIFO 45, which when full generates the signal VEC_FIFO_FULL 26, whose meaning and use was discussed above. The vector at the top of the Vector FIFO 45 is removed therefrom upon receipt of a signal VEC_FIFO_UNLOAD 47 that originates at a Period Generator 49 (to be discussed shortly). Such removed vectors (46) are applied to a Timing/Formatting & Comparison circuit 52 that is connected to the DUT via the associated instance of Pin Electronics 9. That is, each instance of Pin Electronics 9 receives Transmitted & Received Vectors 7 and Pin Electronics configuration information 8 from its associated Timing/Formatting & Comparison circuit 52.

The Timing/Formatting & Comparison circuit 52 has an Internal SRAM 54 addressed by the same Instruction Address ("A" in the small circle) as is the Program SRAM 20 of the Micro-Controller Sequencer 19. (An External DRAM 53 may be used in place of the Internal SRAM 54.) The Internal SRAM 54 (or external DRAM 53) assists in the production of Drive and Comparison cycles. Drive cycles apply a transmit vector to the DUT. Comparison cycles receive a vector presented by the DUT and examine it to determine if it matches previously supplied comparison data. Both Drive and Comparison cycles are adjustable as to their duration, whether and when a load is applied, and when data is latched or strobed. The comparison produces a sixty-four bit value 56 that is applied to a Receive Vector Reverse Mapper/Deserializer 57, whose function may be considered to be the logical inverse of circuit 40. (The operation of circuit 57 is controlled by an SRAM 58 that corresponds to the control of circuit 40 by SRAM 41.) In turn, the output 59 of circuit 57 is applied to the Post Decode circuit 60. At present, it is sufficient to say that the Post Decode circuit 60 can inspect via programmatic criteria both incoming error information 59 and (previously) stored error information 60 (stored in Error Catch RAM) to produce condensed and more readily interpretable error information which may then by stored back into the Error Catch RAM 32 via path 61. An example would be to create a count of how many times there was an error within a particular range of addresses, which information may be useful in deciding when to attempt to engage in on-chip repair by enabling substitute circuits.

We turn now to the Period Generator 49 and its associated Timing SRAM 51. These respond to an eight bit signal T_SEL 43 that, for each two hundred and eight bit instruction fetched by the Micro-Controller Sequencer 19, determines a duration for the associated operation of the Timing/Formatting & Comparison circuit 52. T_SEL 43 is member of the Various Control Values & Instructions 42 that are represented by the different fields within the fetched instruction. As an eight bit value it can represent or encode two hundred and fifty-six different things. In this case those "things" are twenty-eight bit values stored in the Timing SRAM 51 and that are addressed by T_SEL. Each addressed twenty-eight bit value (23) specifies a desired duration with a 19.5 picosecond resolution. The sequence of accessed twenty-eight bit duration values (23) is stored in a Period FIFO 50 so that the individual members of that sequence will be retrieved and applied in synchronism with the retrieval of their intended corresponding vector, which is stored in the Vector FIFO 45.

A coarse timing value field in the oldest entry in the FIFO 50 conveys duration information with a resolution of 5 nsec, and produces therefrom a signal VEC_FIFO_UNLOAD 47 that transfers the next transmit vector from the Vector FIFO 45 to the Timing/Formatting & Comparison circuit 52. A companion signal TIMING REMAINDER 48 is also applied to circuit 52. It is there that the ultimate resolution to 19.5 picoseconds is accomplished.

Figure 3:
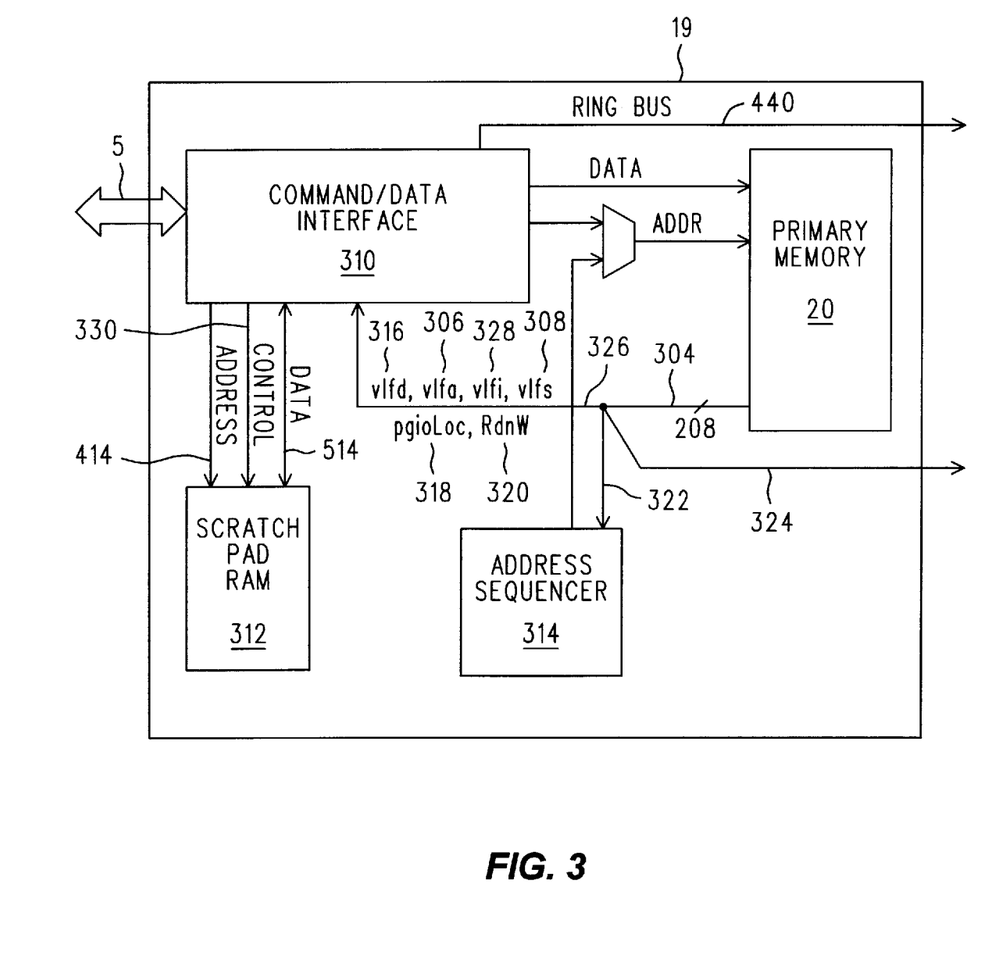
FIG. 3 is a block diagram of the micro-controller sequencer 19 shown in FIG. 2 of the drawings.

With specific reference to FIG. 3 of the drawings, there is shown a block diagram showing further details of the micro-controller sequencer 19 in the DUT tester 6. The micro-controller sequencer 19 comprises an address sequencer 314, the primary memory 20, a command/data interface 310, a scratch pad memory 312, and various interconnections between them all. During DUT tester 6 test pattern execution, the address sequencer 314 steps through sequential instructions in a test pattern. Some of the instructions cause a branch to non-sequential locations. The address sequencer 314 interprets a branching destination or calculates a next address in the sequence as dictated by the instruction. The interpreted or calculated address is then used to access the next program instruction in the primary memory 20. The primary memory 20 has a 208-bit wide instruction word 304, a third segment 322 of which is fetched and executed directly by the address sequencer 314. A first segment 324 of the instruction word 304 is connected to various other portions of the DUT tester 6 for specific operations in conjunction with execution of the program instructions by the micro-controller sequencer 19. A second segment 326 of the instruction word 304 is connected to the command/data interface 310 to support writing to various memory elements in the DUT tester 6 and test site controller 4.

The second segment 326 of the instruction word 304 supports writes and reads to and from a first destination memory 312 or a second destination memory. The topic of the present disclosure specifically addresses the operations in the DUT tester 6 associated with the second segment 326. The DUT tester 6 utilizes the first destination memory 312, termed a "Scratch Pad RAM", for the purpose of storing data as programmed by the test developer during execution of a test pattern. The first destination memory 312 is 16 k deep, 16-bits wide RAM embedded in an ASIC that is a component of the DUT tester 6. The first destination memory 312 is able to accept and store data without slowing other processes performed by the first and second segments 322, 326 of the current program instruction. Multiple words of data may be stored during the test pattern. Upon completion of the test pattern, the test site controller 4 may retrieve the data stored in the first destination memory 312 for further processing. The DUT tester 6 also has a second destination memory (not shown as a unit for reasons that will become apparent). The second destination memory comprises a mapped address space made up of a plurality of DUT tester programming registers, look up tables, and a shadow memory located in the test site controller 4. The command/data interface 310 acts as an intermediary and performs the write and read functions to both the first and second destination memories as specified in the second segment 326 of the instruction 304. Either the test site controller 4 or the test pattern instructions may request reads and writes to the DUT tester 6 memory space. The command/data interface 310 interprets the second segment 326 as well as requests that may come over the test site bus 5 and generates appropriate control signals and presents appropriate addressing and data information for storage in the memory space. In a specific embodiment of the present invention, the command/data interface 310 launches address and data information onto either the ring bus 440 or the address 414 and data 514 lines connected to the first destination memory 312. In addition, the command/data interface 310 generates either first destination memory control lines 330 or control lines as part of the ring bus 440 to effect the appropriate read or write operation.

Due to the nature of the application of the data storage function, the programmed write and read operations also include a programmable indexing feature. Specifically, when writing to multiple locations in the first destination memory 312, a test developer may choose to either write a value to one of the destination memories or may cause the system to add a new value to a previous value, termed "indexing". Alternatively, the addresses to which data is written may be specified directly or indexed. Advantageously, storing data in the first and second destination memories 312, including the optional data or address indexing processes, are performed during a single program instruction cycle while generating test vectors and without impacting the timing with which vectors may be applied to the DUT 14. Accordingly, the data storage operation is performed in parallel with vector processing.

Figure 4:
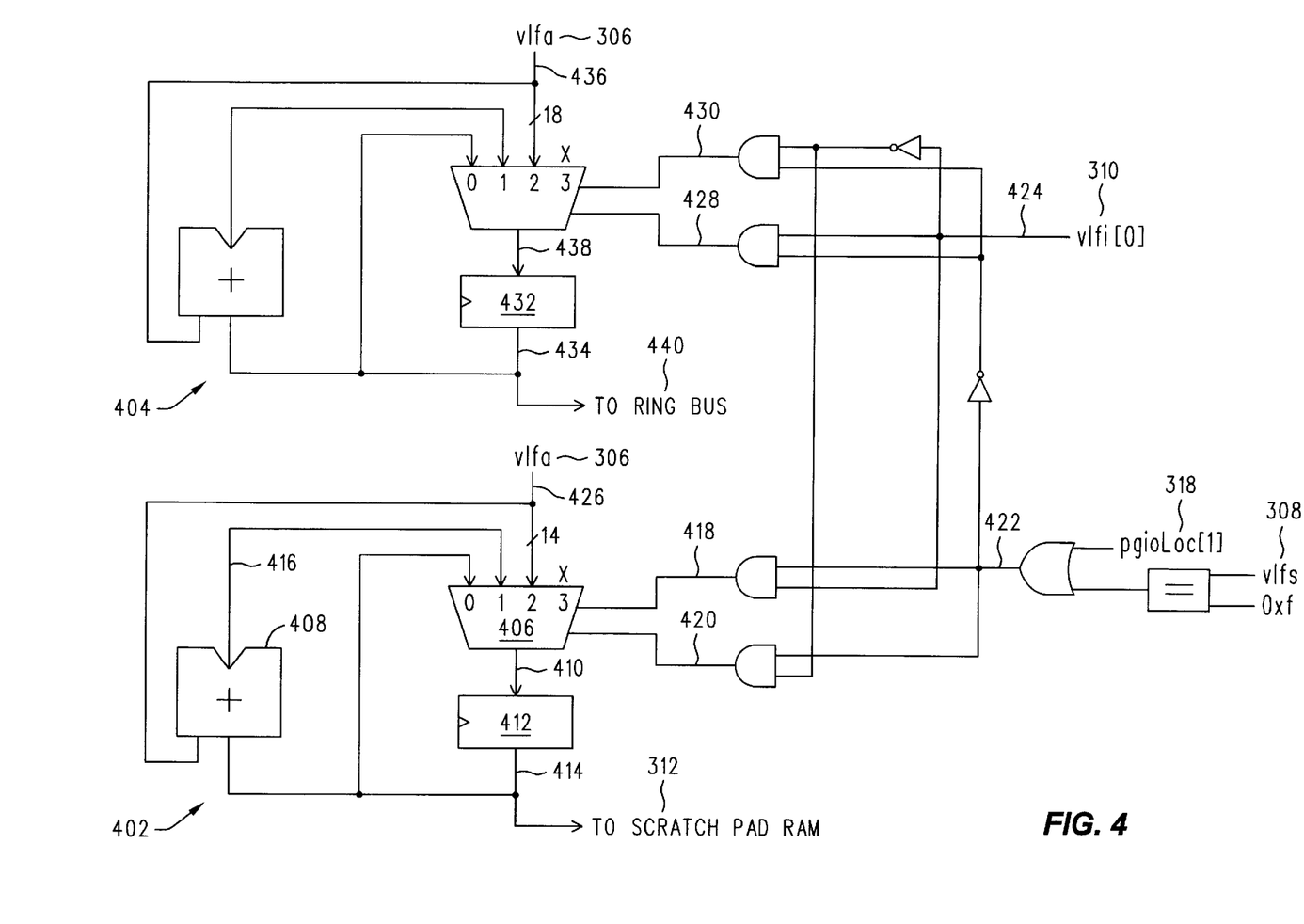
FIGS. 4 and 5 are block diagrams of address and data indexing circuits located in the command/data interface 310 shown in FIG. 3 of the drawings.
Figure 5:
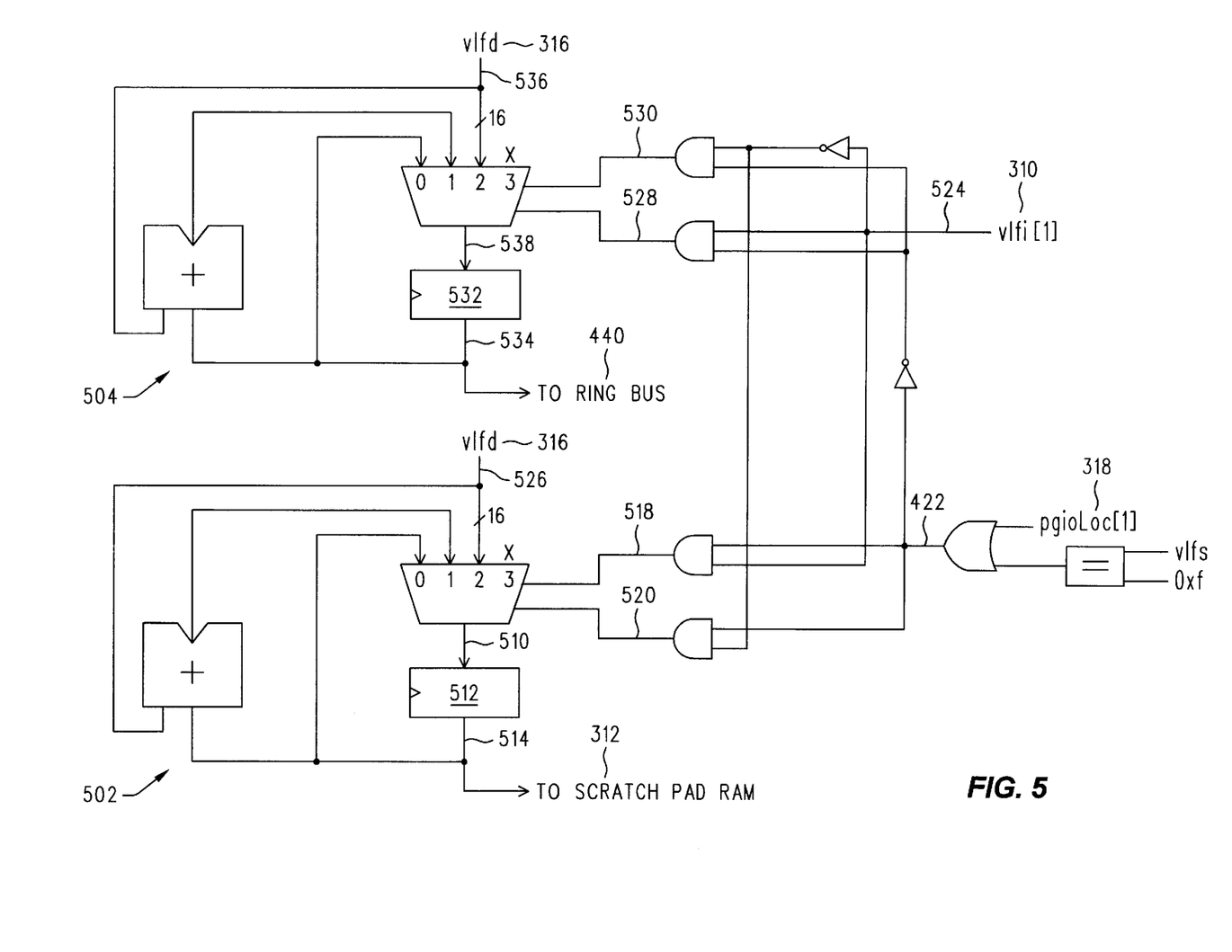

With specific reference to FIGS. 4 and 5 of the drawings, an apparatus according to the teachings of the present invention comprises four indexing circuits within the command/data interface 310 for use with the two destination memories. Each indexing circuit has the same configuration, but responds to different control logic during operation. Each of the first and second destination memories 312 has associated with it an address indexing circuit and a data indexing circuit, specifically the first destination memory 312 has associated with it a first address indexing circuit 402 and a first data indexing circuit 502 while the second destination memory has associated with it a second address indexing circuit 404 and a second data indexing circuit 504. Each of the indexing circuits 402, 404, 502, 504 receives information via the second segment 326 of the program instruction word 304 for operation. The second segment 326 of the instruction word 304 comprises an 18-bit vlfa field 306, a 16-bit vlfd field 316, a 4-bit vlfs field 308, a 2-bit vlfi field 310, a 2-bit pgioLoc field 318, and a Read not Write (RdnWr) bit 320. The third segment 326 is connected to the indexing circuits 402, 404, 502, 504 in the command/data interface 310. The vlfa field 316 is connected to the first and second address indexing circuits 402, 404 and provides addressing into the first and second destination memories 312, not shown respectively. The vlfd field 316 provides the data for use in the first and second data indexing circuits 502, 504 for generating the data that is to be stored at the addressed memory locations in the first and second destination memories 312, not shown respectively. The vlfs field 308 indicates a code specifying the scratch pad RAM 312 as a source or destination for data retrieval or storage. The first data and address indexing circuits 402, 502 hold their values unless the vlfs field 308 reflects the appropriate value. The vlfs field 308 may contain other values that are used in operations that are beyond the scope of the present disclosure. Bit zero of the vlfi field 310 is an address indexing bit 424 and specifies a use of an address indexing circuit, a zero value indicating that the vlfa field 306 contains an address value and a one value indicating that the vlfa field 306 specifies a value that is to be indexed to the previous address value. Bit one of the vlfi field 310 is a data indexing bit 524 and specifies a use of a data indexing circuit, a zero value indicating that the vlfd field 316 contains a data value and a one value indicating that the vlfd field 316 specifies a value that is to be indexed to the previous data value. The 2-bit pgioLoc field 318 specifies which of the destination memories are to be addressed. A "00" binary value specifies the DUT tester 6 portion of the second destination memory for writes and reads as pointed to by the value in the address indexing circuit 402 or 404. A "01" binary value specifies a test site controller 4 portion of the second destination memory, i.e. the shadow memory, for writes and reads as pointed to by the value in the vlfa field 316. A "10" binary value specifies the first destination memory 312 for writes and reads as pointed to by the value in the address indexing circuit. A "11" binary value is undefined. Only bit 1 of the pgioLoc field 318 implicates operation of the indexing circuits 402, 404, 50, 504. The command/data interface 310, however, interprets both bits in the pgioLoc field 318 to determine which of the mapped address spaces within the second destination memory to access for the operation. The RdnW bit 320 directs the command/data interface 310 whether the operation chosen is a read or a write to the specified first or second destination memories 312, not shown.

With specific reference to FIG. 4 of the drawings, there is shown a further detail of the first and second address indexing circuits within the command/data interface 310. The first destination memory 312 is used to store data as programmed by the test developer. The second destination memory comprises a mapped address space made up of a number of DUT tester registers, scramble RAM within the address mapper 29, the auxiliary RAM 31, the error catch RAM 32, and address crossover memory. All of the various registers and memories fit within the memory space addressable by the second destination memory. All indexing circuits are described herein using the first address indexing circuit 402 as an example. The remaining indexing circuits 404, 502, 504 are identical in structure. The indexing circuit 402 receives data from an input port 426. Values from the input port 426 are routed to a selector 406 and an accumulator 408. A selector output 410 is latched into a holding register 412. The holding register 412 presents its contents at a register output 414. The register output 414 of each indexing circuit is connected to unique portions of the first and second destination memories 312, not shown. The register output 414 is re-circulated as one of the inputs to the selector 406. The register output 414 is also an input to the accumulator 408. The accumulator 408 sums its two inputs; the register output 414 and the value in the input port 426, to generate an accumulator output 416. The accumulator output 416 is also an input to the selector 406. Accordingly, there are three inputs into the selector 406. A fourth input is unused in a specific embodiment. The selector 406 is able to present at the selector output 410 either a value unchanged from a previous value (i.e. a recirculated value), a value presented at the input port 426 by the vlfa or vlfd fields 306, 316 respectively, or a sum of the previous value and the value presented at the input port 426. Two bits of a selection code are unique for each one of the indexing circuits 402, 404, 502, 504 and determine the operation performed and the value presented at the respective register outputs 414.

In the specific embodiment, the value presented at the input port 404 of the first address indexing circuit 402 is the 14 lower bits in the 18-bit vlfa field 306 from the current program instruction word 304. The remaining 4 bits in the vlfa field 306 are unused in the first address indexing circuit 402. The value presented at the input port 404 of the second address indexing circuit 404 is the full 18-bit vlfa field 306 from the current program instruction word 304. If as a matter of design choice the first destination memory 312 were to be enlarged, the first address indexing circuit could be scaled as necessary.

A selection of the respective selector output 414 is based upon logic also within the command/data interface 310. The logic interprets the 4-bit vlfs field 308, one of the bits from the 2-bit pgioLoc field 318, and one of the bits from the 2-bit vlfi field 310 to generate the 2-bit selection code. The selection code for the first and second address indexing circuits 402, 404 is based partially upon a first destination memory enable 422. The first destination memory enable 422 is the disjunctive combination of bit one of the pgioLoc field 318 and a result of a bit-wise compare of the 4-bit vlfs field 308 and a 0xf value. The 0xf value is assigned as a matter of design choice to the selection of the first destination memory 312 for data storage or retrieval. Accordingly, if either the vlfs field 308 or the pgioLoc field 318 specifies the code for the first destination memory 312, the first destination memory enable 422 is true. The selection code for the first and second address indexing circuits 402, 404 is also based partially upon an address indexing bit 424 specified as bit zero of the vlfi field 328.

With specific reference to the selection code of the first address indexing circuit 402, termed a first address indexing selection code, a first address indexing circuit lower bit 418 is a conjunctive combination of the first destination memory enable 422 and an address indexing bit 424. A first address indexing upper bit 420 is a conjunctive combination of the inverse of the address indexing bit (meaning no indexing) and the first destination memory enable 422. A "00" binary value for the first address indexing selection code 420, 418 indicates a false first destination memory enable 422. Accordingly, the first indexing circuit merely re-circulates the value in the first address register 412 and no change is made. This is the default value and the benign value programmed in the instruction word 304 when no operation is desired. A "01" binary value for the first address indexing selection code 420, 418 indicates a true first destination memory enable 422 and a true address indexing bit. The "01" binary value presents the sum of the input port value 426 and the register output value 414 to the selector output 410 and latches it into the register 412. A "10" binary value for the first address indexing selection code 420, 418 indicates a true first destination memory enable 422 and a false address indexing bit 424. The "10" binary value presents the value of the vlfa field 306 as the selector output 410 and lathes it into the register 412. The "11" binary value is undefined in the present embodiment and will not occur with the disclosed logic that supports the indexing circuits. The register output 414 is connected to the first destination memory 312 or scratch pad RAM 312 for accessing a desired location in the first destination memory 312 for either the read or write operation.

With specific reference to the selection code of the second address indexing circuit 404, termed a second address indexing selection code, a second address indexing circuit lower bit 428 is a conjunctive combination of the inverse of the first destination memory enable 422 and an address indexing bit 424. A second address indexing upper bit 430 is a conjunctive combination of the inverse of the address indexing bit (meaning no indexing) and the inverse of the first destination memory enable 422. The second address indexing selection code operates similarly to the first address indexing selection code except that a true value of either one of the two conjunctive operations is based upon a false first destination enable bit 422. In the embodiment shown, all read or write operations operate on either the first or the second destination memory and the operations are mutually exclusive of each other. A "00" binary value for the second address indexing selection code 430, 428 indicates a true first destination memory enable 422. Accordingly, the second address indexing circuit merely re-circulates the value in a second address register 432 and no change is made. This is the default value and the benign value programmed in the instruction word 304 when no operation is desired. A "01" binary value for the second address indexing selection code 430, 428 indicates a false first destination memory enable 422 and a true address indexing bit. The "01" binary value presents the sum of the vlfa field 306 presented at the second address input port value 436 and a second address register output value 434 to the second address selector output 438 and latches it into the second address register 432. A "10" binary value for the second address indexing selection code 430, 428 indicates a false value for the first destination memory enable 422 and a false value for the address indexing bit 424. The "10" binary value presents the value of the vlfa field 306 as the second address selector output 438 and latches it into the second address register 432. The "11" binary value is undefined in the present embodiment and will not occur with the disclosed logic that supports the indexing circuits. The second address register output 434 is connected to an address portion of the ring bus 440 that accesses storage locations with the second destination memory for either the read or write operations.

With specific reference to FIG. 5 of the drawings, there is shown first and second data indexing circuits 502, 504. The first and second data indexing circuits include identical logic as the first and second address indexing circuits 402,404, but receive the vlfd field 316, receive bit one of the vlfi field 310, and are dedicated to data buses in respective ones of the first and second destination memories 312, not shown. Bit one of the vlfi field 310 is termed a data indexing bit 524.

With specific reference to the selection code of the first data indexing circuit 502, termed a first data indexing selection code, a first data indexing circuit lower bit 518 is a conjunctive combination of the first destination memory enable 422 and the data indexing bit 524. A first data indexing upper bit 520 is a conjunctive combination of the inverse of the data indexing bit 524 (meaning no indexing) and the first destination memory enable 422. A "00" binary value for the first data indexing selection code 520, 518 indicates a false first destination memory enable 422. Accordingly, the first data indexing circuit merely re-circulates the value in a first data register 512 and no change is made. This is the default value and the benign value programmed in the instruction word 304 when no operation is desired. A "01" binary value for the first data indexing selection code 520, 518 indicates a true first destination memory enable 422 and a true data indexing bit. The "01" binary value presents the sum of the vlfd field 316 presented at a data input port 526 and the first data register output value 514 to a first data selector output 510 and latches it into the first data register 512. A "10" binary value for the first data indexing selection code 520, 518 indicates a true first destination memory enable 422 and a false data indexing bit 524. The "10" binary value presents the value of the vlfd field 316 as the first data selector output 510 and lathes it into the first data register 512. The "11" binary value is undefined in the present embodiment and will not occur with the disclosed logic that supports the indexing circuits. The first data register output 514 is connected to the first destination memory 312 or scratch pad RAM 312 for presentation as data to an accessed location in the first destination memory 312 for either the read or write operation.

Figure 6:
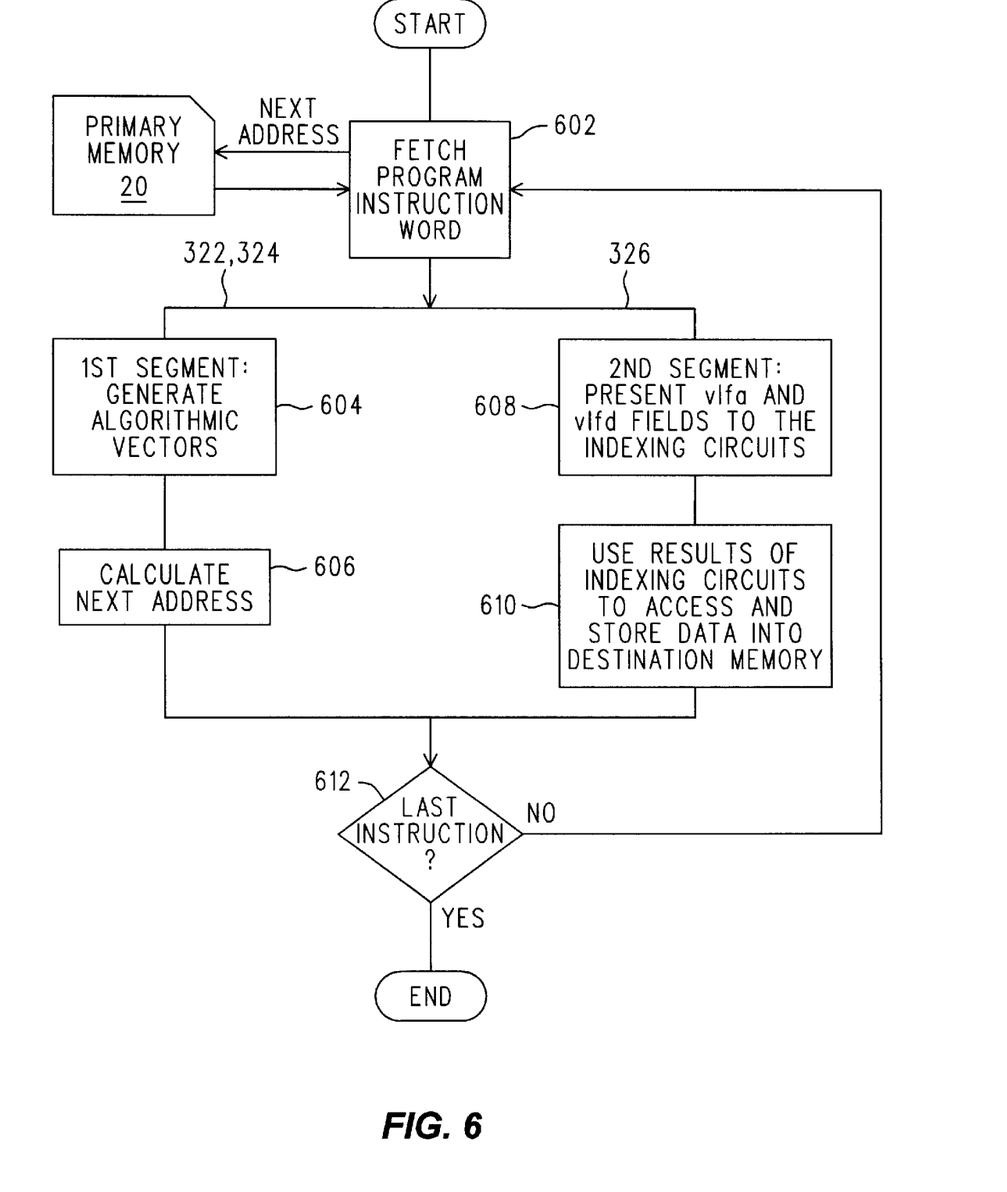
FIG. 6 is a flow chart of a method according to the teachings of the present invention.

With specific reference to the selection code of the second data indexing circuit 504, termed a second data indexing selection code, a second data indexing circuit lower bit 528 is a conjunctive combination of the inverse of the first destination memory enable 422 and the data indexing bit 524. A second data indexing upper bit 530 is a conjunctive combination of the inverse of the data indexing bit 524 (meaning no indexing) and the inverse of the first destination memory enable 422. The second data indexing selection code operates similarly to the first data indexing selection code except that a true value of either one of the two conjunctive operations is based upon a false first destination enable bit 422. In the embodiment shown, all read or write operations operate on either the first or the second destination memory and the operations are mutually exclusive of each other. A "00" binary value for the second data indexing selection code 530, 528 indicates a true first destination memory enable 422. Accordingly, the second data indexing circuit merely re-circulates the value in a second data register 532 and no change is made. This is the default value and the benign value programmed in the instruction word 304 when a hold or no operation is desired. A "01" binary value for the second data indexing selection code 530, 528 indicates a false first destination memory enable 422 and a true data indexing bit. The "01" binary value presents the sum of the vlfd field 316 presented at a second data input port 536 and a second data register output value 534 to the second data selector output 538 and latches it into the second data register 532. A "10" binary value for the second address indexing selection code 430, 428 indicates a false value for the first destination memory enable 422 and a false value for the data indexing bit 524. The "10" binary value presents the value of the vlfd field 316 as the second data selector output 538 and latches it into the second data register 532. The "11" binary value is undefined in the present embodiment and will not occur with the disclosed logic that supports the indexing circuits. The second data register output 534 is connected to a data portion of the ring bus 440 that access the various locations with the second destination memory for either the read or write operation. With specific reference to FIG. 6 of the drawings, there is shown a flow chart of a method according to the teachings of the present invention in which a program instruction word 304 is fetched from the primary memory 20 at 602. The program instruction word 304 comprises the first and third segments 322, 324 (hereinafter collectively termed the first segment 322) and the second segment 326. The first and second segments 322, 326 are executed simultaneously. The first segment 322, 324 performs test pattern functions including, but not limited to algorithmic vector generation, branching, calculation of a next address in primary memory from which the next program instruction word 304 is to be fetched, and timing and voltage formatting and a second segment 326. The step of executing the first segment generally comprises the steps of generating algorithmic vectors for driving and comparing received bits to and from the DUT 14 at 604 and calculating the next address at 606. The step of executing the second segment comprises the steps of presenting values in the vlfa 306 and vlfd 316 fields to indexing circuits 402, 404, 502, and 504 at 608. Each indexing circuit 402, 404, 502, 504 is also presented with a selection code 420,418, 430, 428, 520, 518, 530, 528 based upon the vlfs 308, pgioLoc 318, and vlfi 328 fields in the second segment 326. The outputs 414, 434, 514, 534 of the indexing circuits 402, 404, 502, 504 are used to address and provide data to first and second destination memories 312, not shown respectively at 610. Before fetching the next instruction, the method first determines if the current instruction is a quit instruction indicating the end of the current test pattern at 612. If so, the test pattern ends. If not, the next program instruction word is fetched from primary memory 20 and the process continues.

The present disclosure discusses features of the present invention, which are described by way of example. One of ordinary skill in the art appreciates that the present invention may be scaled and adapted without departing from the scope of the claims. The present disclosure is intended to be illustrative and not limitative of the present invention. The scope of the invention is defined solely by the appended claims.

What is claimed is:

1. An apparatus for automatically accumulating and storing information comprising:
   a destination memory, and
   an indexing circuit comprising
      an input port,
      a selector having a selector output,
      a register holding a value from said selector output and presenting said value at a register output,
      an accumulator accepting a value from said input port and a value from said register output and presenting a sum of said values at an accumulator output,
      said selector receiving said value from said input port, said accumulator output, and said value from said register output, said selector output being based upon a programmable selection code,
   said register output being connected to said destination memory.

2. An apparatus as recited in claim 1 wherein said indexing circuit is a data indexing circuit providing data information for storage in said destination memory.

3. An apparatus as recited in claim 1 wherein said indexing circuit is an address indexing circuit for accessing storage locations within said destination memory.

4. An apparatus as recited in claim 2 and further comprising an address indexing circuit wherein said register is an address register and a value in said address register accesses storage locations within said destination memory and said register in said data indexing circuit is a data register and a value in said data register provides data for storage in said destination memory.

5. An apparatus as recited in claim 1 wherein said indexing circuit is a first indexing circuit and said destination memory is a first destination memory and further comprising a second indexing circuit connected to a second destination memory.

6. An apparatus as recited in claim 5 wherein said first and second destination memories are mutually exclusive alternatives for storing data during a single storage cycle.

7. An apparatus as recited in claim 1 wherein said destination memory comprises a plurality of memory elements in a mapped address space.

8. An apparatus as recited in claim 1 wherein said destination memory comprises a random access memory.

9. An apparatus as recited in claim 4 wherein said data indexing circuit is a first data indexing circuit, said address indexing circuit is a first address indexing circuit, and said destination memory is a first destination memory wherein said first address indexing circuit addresses said first destination memory for storage of data from said first data indexing circuit and further comprising a second data indexing circuit, a second address indexing circuit, and a second destination memory wherein said second address indexing circuit addresses said second destination memory for storage of data from said second data indexing circuit.

10. An apparatus as recited in claim 9 wherein said first destination memory is a random access memory and said second destination memory comprises a plurality of memory elements in a mapped address space.

11. An apparatus as recited in claim 10 wherein accesses to said first and second destination memories are mutually exclusive of each other.

12. An apparatus as recited in claim 1 and further comprising a sequencer for fetching sequential program instruction words and wherein said values at said input port are based upon each one of said program instruction words.

13. An apparatus as recited in claim 12 wherein said programmable selection code is based upon each one of said program instruction words.

14. A method for storing information comprising the steps of:
   fetching a program instruction word, said program instruction word comprising a first segment and a second segment,
   executing said first segment,
   executing said second segment, comprising the steps of presenting a value to a programmable indexing circuit, presenting a selection code to said indexing circuit, and accessing a destination memory with an output of said indexing circuit.

15. A method as recited in claim 14, said step of executing said second segment further comprising the steps of generating said selection code from said second segment.

16. A method as recited in claim 14, said step of executing said second segment further comprising the steps of presenting an address field and a data field to an address indexing circuit and a data indexing circuit respectively, accessing a location in said destination memory with an output of said address indexing circuit, and storing an output of said data indexing circuit in said location in said destination memory.

17. A method as recited in claim 14, said step of executing said second segment further comprising the steps of presenting a value to first and second indexing circuits, presenting first and second selection codes to said indexing circuits, and accessing a first destination memory with an output of said first indexing circuit and accessing a second destination memory with an output of said second indexing circuit.

18. A method as recited in claim 17 wherein said step of accessing said first destination memory and said step of accessing said second destination memory are mutually exclusive of each other.

19. A method as recited in claim 14, wherein said selection code is based upon said second segment.

20. A method as recited in claim 19, wherein said step of presenting a selection code to said indexing circuit causes the indexing circuit to perform one of the steps in the following list of steps comprising holding a value in said indexing circuit, accepting a value presented to said indexing circuit, and summing a value in said indexing circuit with said value presented to said indexing circuit, one of said steps resulting in a value at an output of said indexing circuit, said value at said output of said indexing circuit accessing said destination memory.

* * * * *